July 6, 1965 J. G. BAMBERGER Re. 25,816

CATAMARAN TYPE BOATS

Original Filed April 18, 1960 2 Sheets-Sheet 1

INVENTOR.
Julian G. Bamberger
BY
Mossell & Mossell
ATTORNEYS.

CATAMARAN TYPE BOATS

Original Filed April 18, 1960

INVENTOR.
Julian G. Bamberger
BY
Morsell & Morsell
ATTORNEYS.

United States Patent Office

Re. 25,816
Reissued July 6, 1965

25,816
CATAMARAN TYPE BOATS

Julien G. Bamberger, Milwaukee, Wis., assignor to Masco Corporation, Milwaukee, Wis., a corporation of Wisconsin Original No. 3,077,851, dated Feb. 19, 1963, Ser. No. 22,762, Apr. 18, 1960. Application for reissue Nov. 15, 1963, Ser. No. 357,342
2 Claims. (Cl. 114—62)

Matter enclosed in heavy brackets [ ] appears in the original patent but forms no part of this reissue specification; matter printed in italics indicates the additions made by reissue.

This invention relates to improvements in catamaran type boats.

The conventional boat has a hull formed with a bottom which is V-shaped or convex in cross section and is usually provided with a single center keel. These boats present considerable resistance to the water, particularly at the bow and lack maximum stability. In my Patent No. 2,422,818, issued June 24, 1947, a double keel boat is illustrated and described which has certain advantages particularly for use with an air propeller in the stern. The present invention relates to improvements upon the construction illustrated in my prior patent and discloses a boat which is particularly adapted to be driven by an under water propeller.

A principal object of the present invention is to provide a boat wherein the soft ride advantage of a catamaran are obtained while providing the controlled banking and speed of conventional boats.

A more specific object of the invention is to provide a boat which obtains the above advantages by having the spacing between keels less than fifty percent of the effective width of the bottom and preferably more than forty percent of said width.

A still further object of the invention is to provide a boat wherein the bottom portion, outwardly of each keel, forms a dihedral angle which is progressively greater from the stern to the bow, said angle being relatively flat.

Other objects of the invention are to provide an improved boat construction wherein the center, between keels, has a bottom portion which is recessed to provide a tunnel extending from the bow entirely through to the stern to provide a path for foam and bubbles and to increase the lifting effect, the depth of said tunnel being progressively reduced as it approaches the transom whereby there is a tendency to lift the stern while the boat is in motion to level the ride to thereby improve performance and increase speed.

A further object of the invention is to provide a boat which is so shaped as to restrict the area for disturbed water by shaping the bottom so as to reduce its tendency to disturb the surface of the water rather than increase it as in conventional boats.

With the above and other objects in view, the invention consists of the improved catamaran type boat, and all of its parts and combinations, as set forth in the claim, and all equivalents thereof.

In the accompanying drawings, illustrating one complete embodiment of the preferred form of the invention in which the same numerals designate the same parts in all of the views.

FIGS. 8 to 12 inclusive are views corresponding to FIGS. 3 to 7 respectively, showing a slightly modified cross sectional shape; and FIGS. 13 to 17 inclusive are views corresponding to FIGS. 3 to 7 respectively, showing still another modified cross sectional shape.

Figure 1:
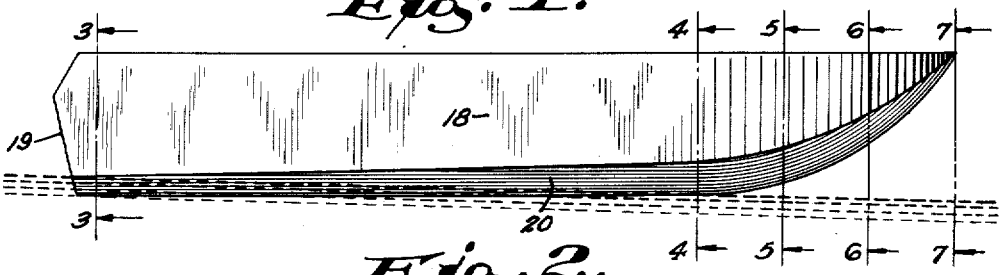
FIG. 1 is a side elevational view of the improved boat.
Figure 2:
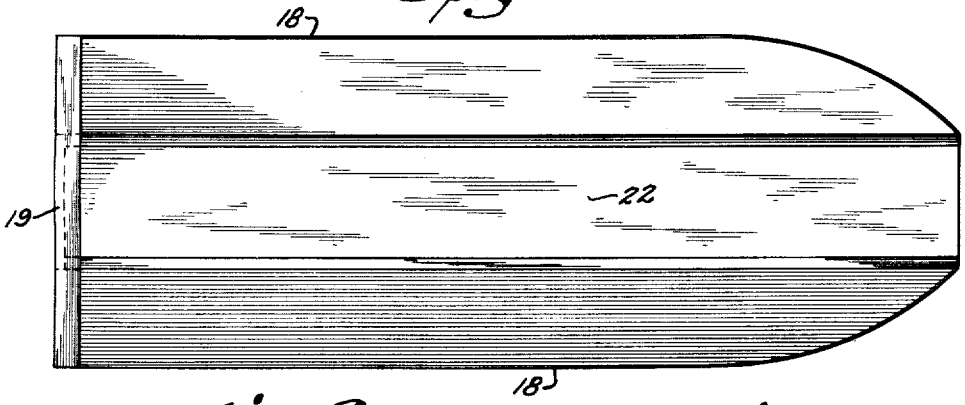
FIG. 2 is a bottom view thereof.

Referring more particularly to the drawings, the boat of FIG. 1 comprises a hull having sides 18 and a transom 19. The boat has bottom portions 20 which form a dihedral angle and which converge somewhat toward one another in cross sectional view to provide keels 21. Between the keels and extending from the bow through the stern is a tunnel 22 formed by a longitudinal recess having a roof portion 23 which, in the form of the invention of FIG. 1, is straight in transverse section. In this form of the invention the tunnel has diverging sides 24 which are at an oblique angle with respect to the bottom portion 20.

It is an important feature of the present invention that the spacing between the keels 21 be not substantially less than forty percent of the effective width of the bottom and not substantially more than fifty percent of said effecitve width. This spacing between keels is the distance a of FIG. 3. In the boat of FIG. 1 the effective width of the bottom is the distance between the chines 25, which is the distance b. By examining FIGS. 3 to 7 inclusive, it will be apparent that the depth of the tunnel is progressively reduced from the bow to the stern, FIG. 3 being substantially at the point of minimum tunnel depth.

The dihedral angles at 20 are relatively moderate but are so worked out as to give effective banking control. This angle is progressively sharper from the stern to the bow. The angle at the stern (FIG. 3) may be 5°–15° and become progressively sharper toward the bow as shown in FIGS. 3 to 7 so that at the section of FIG. 4 it may be 15°–60°. In other words, the minimum angle in the construction of FIGS. 1 to 7 may be 5° at the section of FIG. 3, and 15° at the section of FIG. 4, and the maximum angle may be 15° at FIG. 3, and 60° at FIG. 4. By maintaining the distance a of FIG. 3 less than fifty percent of b, the effective width of the bottom, the sum of the widths of the dihedral angle portions 20 is more than fifty percent of the effective width of the bottom. This gives sufficient surface for banking and makes it possible to provide effective banking control for turning the boat while it is under power.

Figure 3:
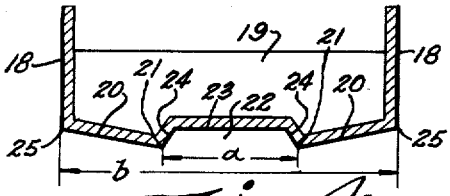
FIG. 3 is a transverse sectional view near the stern.
Figure 6:
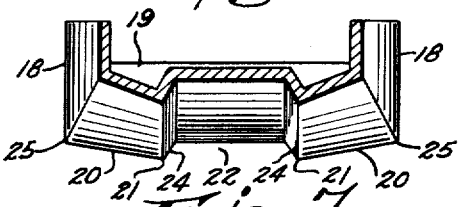
FIG. 6 is a sectional view taken on the line 6—6 of FIG. 1.
Figure 4:
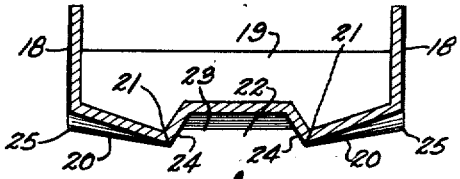
FIG. 4 is a transverse sectional view taken on the line 4—4 of FIG. 1.
Figure 7:
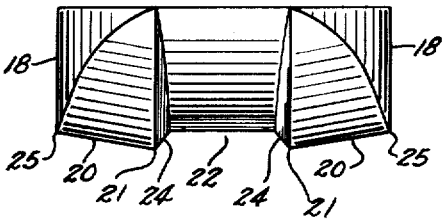
FIG. 7 is a front elevational view of the boat taken on the line 7—7 of FIG. 1.
Figure 5:
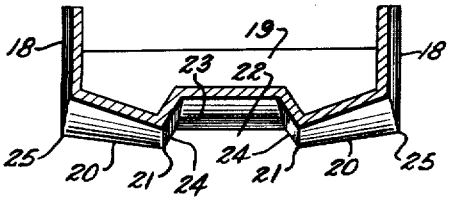
FIG. 5 is a transverse sectional view taken on the line 5—5 of FIG. 1.
Figure 8:
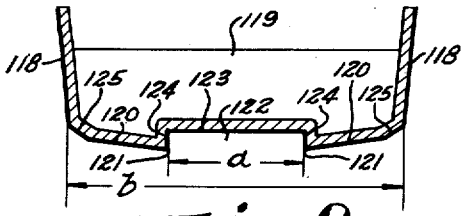
Figure 9:
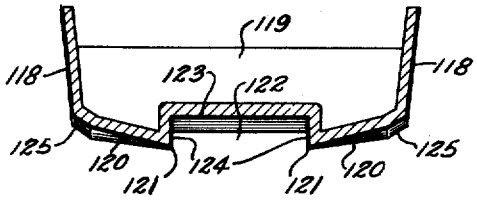
Figure 10:
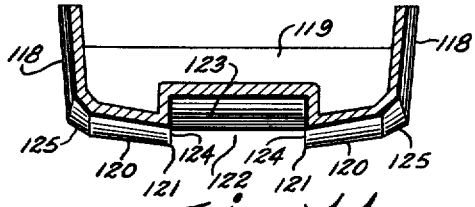
Figure 11:
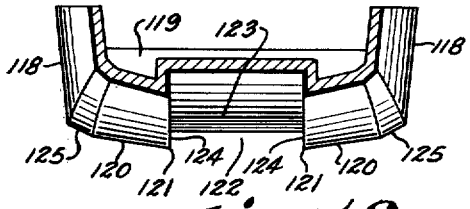
Figure 12:
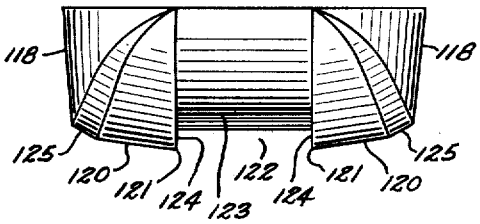

In the modification of FIGS. 8–12 inclusive, FIG. 8 is taken at the same location on the boat as FIG. 3, FIG. 9 at the same location as FIG. 4, FIG. 10 at the same location as FIG. 5, FIG. 11 at the same location as FIG. 6 and FIG. 12 at the same location as FIG. 7. This form of the invention is substantially the same as the form of the invention of FIGS. 3 to 7, except that the sides 118 are angled slightly inwardly as compared with the straight sides 18 of FIG. 3; the sides 124 of the tunnel are vertical instead of downwardly diverging as at 24 in FIG. 3; and the chine, instead of being formed by a sharp corner as at 25 in FIG. 3, is formed by angular surfaces 125. In this form of the invention the effective width of the bottom b includes the chines as illustrated in FIG. 3 and the width a in FIG. 8 bears the same relationship with the width b as was described in connection with the corresponding widths in FIG. 3.

Figure 13:
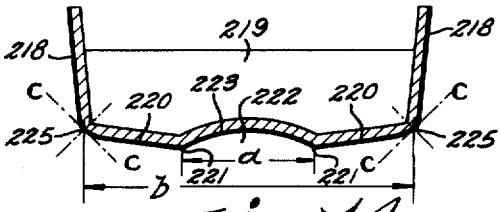
Figure 14:
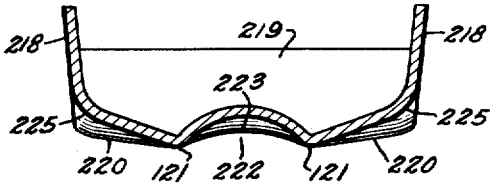
Figure 15:
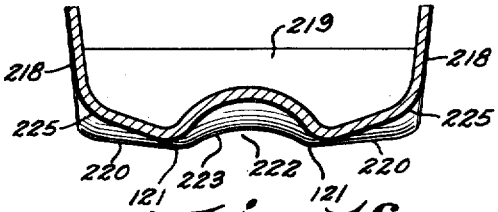
Figure 16:
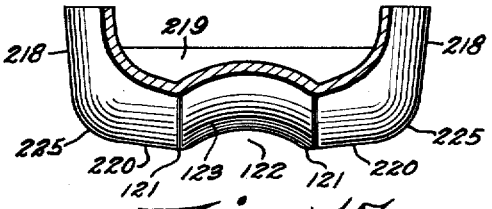
Figure 17:
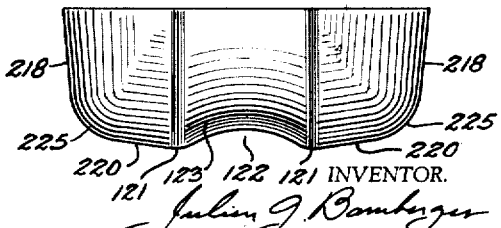

FIGS. 13 to 17 inclusive show still another modification where the tunnel is concave and where the chines are round. Here, the section of FIG. 13 is taken in a corresponding position to FIG. 3; the section 14 in a corresponding position to FIG. 4; the section 15 in a corresponding position to FIG. 5; the section FIG. 16 in a corresponding position to FIG. 6, and the view of FIG. 17 in a corresponding position to FIG. 7. In this form of the invention the sides 218 are angled similarly to the sides 118 of FIG. 8. Here, the tunnel 122 has an arcuate cross section, as illustrated, with the depth of the tunnel progressively increasing toward the bow just as in the from the invention of FIGS. 1 to 7. The chines 225, instead of being on a straight angle, as in FIG. 8, or a sharp corner as in FIG. 3, are rounded as illustrated. The bottom portions 220 correspond in all respects to the bottom portions 20 of FIG. 3, the effective width b of the bottom of the construction of FIG. 13 extending as illustrated and bearing the same relationships to the effective width a of the tunnel, as heretofore described in connection with FIGS. 1 to 7.

It is apparent taht in all forms of the invention the tunnel section is so shaped as to minimize shock by having the tunnel deeper at the bow. Thus the shock of hitting the waves is reduced. The tunnel is maintained for the full length of the boat to provide a path for foam and bubbles and to increase the lifting surface. The depth of the tunnel as it approaches the transom is reduced to approximately half of the depth at 4—4 in FIG. 1. By having the tunnel of less depth at the stern there is more of a tendency to lift the stern of the boat while in motion. This levels the ride, and improves performance and speed.

The boat of the present invention rides on the surfaces 20—20, 120—120, or 220—220. An added support is gained by restricting the areas for disturbing water and by shaping the bottom so as to reduce the tendency to disturb the water.

In all forms of the invention the effective width of the bottom terminates on each side at the chines. In the case of the round chine boat of FIGS. 13 to 17, approximately half of the cross section of each chine is effective as bottom surface, said effective width of the bottom being terminated at the point on the chines where a 45° line c becomes tangent to the chine. This effective bottom width is designated b in FIG. 13. In all forms of the invention the width a of the tunnel is no less than forty percent and no more than fifty percent of the effective bottom width b. This insures that the bottom portions 20—20, 120—120 plus 125—125, and 220—220 plus part of 225—225, are more than fifty percent of the effective width of the bottom of the boat to give added support for banking.

In all forms of the invention the spaced apart keels are substantially parallel and straight throughout their length from the stern of the boat at least to the farthest forward potential water line at the bow. The relationship of the water line, during normal use of the boat, on the boat is indicated by the dash lines in FIG. 1. Here it will be seen that adjacent the stern the water line is practically alined with the top of the tunnel. The farthest forward potential water line near the bow is approximately at the section line 4—4 of FIG. 1. Here it will be seen that practically the entire depth of the tunnel at 4—4 is above the water line during normal use of the boat, with normal loads and at normal speeds.

As a result of the design features of the present invention the soft ride advantages of a catamaran boat are obtained while providing for the speed and controlled banking of a conventional boat.

It is to be understood that the present invention is not to be limited to the exact details of construction shown and described for obvious modifications will occur to persons skilled in the art.

What I claim is:

[1. In a boat, a hull having spaced-apart keels which are substantially parallel and straight throughout the length from the stern of the boat at least to the farthest forward potential water line of the bow, the bottom of the hull from the stern of the boat at least to the farthest forward potential water line at the bow having a tunnel extending entirely through to the rear extremity of the boat whereby said hull has an effective bottom portion formed by longitudinally extending spaced pontoons, one on each side of said tunnel, each keel being on the innerside of each pontoon adjacent the tunnel, each pontoon having an effective bottom lifting surface substantially all of which is outwardly of the keel and which is angled in one general direction only outwardly and upwardly from the keel, said angle being between 5° and 15° at the stern and progressing to between 15° and 60° at the farthest forward potential water line adjacent the bow, the sum of the widths of said effective bottom surfaces of the pontoons being more than 50% of the effective width of the bottom of the hull and the width of the tunnel portion being less than 50% of said effective width, the angle of each of said effective bottom lifting surfaces being such that the boat normally rides substantially exclusively on the full width of said lifting surfaces when proceeding in a straight-forward direction, all of said width of said lifting surfaces being outwardly of the keels.]

*2. In a boat, a hull having spaced-apart keels which are substantially parallel and straight throughout the length from the stern of the boat at least to the farthest forward potential water line of the bow, the bottom of the hull from the stern of the boat at least to the farthest forward potential water line at the bow having a tunnel extending entirely through to the rear extremity of the boat whereby said hull has an effective bottom portion formed by longitudinally extending spaced pontoons, one on each side of said tunnel, each keel being on the innerside of each pontoon adjacent the tunnel, each pontoon having an effective bottom lifting surface substantially all of which is outwardly of the keel and which is angled in one direction only outwardly and upwardly from the keel, said angle being between 5° and 15° at the stern and progressing to between 15° and 60° at the farthest forward potential water line adjacent the bow, the sum of the widths of said effective bottom surfaces of the pontoons being more than 50% of the effective width of the bottom of the hull and the width of the tunnel portion being less than 50% of said effective width, the angle of each of said effective bottom lifting surfaces of the pontoons being such that at substantially all running speeds the boat normally rides substantially exclusively on the full width of said lifting surfaces of the pontoons from the stern of the boat to approximately the vicinity of the farthest forward potential water line at the bow, which lifting surfaces of the pontoons, together with the top of the tunnel, provide the sole upward force when proceeding in a straightforward direction, all of said width of said lifting surfaces of the pontoons being outwardly of the keels.*

*3. In a boat, a hull having spaced-apart keels which are substantially parallel and straight throughout the length from the stern of the boat at least to the farthest forward potential water line of the bow, the bottom of the hull from the stern of the boat at least to the farthest forward potential water line at the bow having a tunnel extending entirely through to the rear extremity of the boat whereby said hull has an effective bottom portion formed by longitudinally extending spaced pontoons, one on each side of said tunnel, each keel being on the inner side of each pontoon adjacent the tunnel, each pontoon having an effective bottom lifting surface substantially all of which is outwardly of the keel and which is angled in one general direction only outwardly and upwardly from the keel, said angle progressing in sharpness from the stern to between 15° and 60° at the farthest forward potential water line adjacent the bow, the sum of the widths of said effective bottom surfaces of the pontoons being more than 50% of the effective width of the bottom of the hull and the width of the tunnel portion being less than 50% of said effective width, the angle of each of*

*said effective bottom lifting surfaces of the pontoons being such that at substantially all running speeds the boat normally rides substantially exclusively on the full width of said lifting surfaces of the pontoons from the stern of the boat to approximately the vicinity of the farthest forward potential water line at the bow, which lifting surfaces of the pontoons, together with the top of the tunnel, provide the sole upward force when proceeding in a straightforward direction, all of said width of said lifting surfaces of the pontoons being outwardly of the keels.*

References Cited by the Examiner

The following references, cited by the Examiner, are of record in the patented file of this patent or the original patent.

UNITED STATES PATENTS

| | | | |
|---|---|---|---|
| 2,181,463 | 11/39 | Pratt | 114—56 |
| 2,185,430 | 1/40 | Burgess | 114—56 |
| 2,336,987 | 12/43 | Garber | 114—56 |
| 2,354,569 | 7/44 | Beard | 114—66.5 |
| 2,367,323 | 1/45 | Apel | 114—66.5 |
| 2,422,818 | 6/47 | Bamberger | 114—66.5 |
| 2,515,005 | 7/50 | Hickman | 114—66.5 |
| 2,666,406 | 1/54 | Babcock | 114—61 |
| 2,915,031 | 12/59 | Johnston | 114—56 |
| 2,945,466 | 7/60 | Shelton | 114—62 |

MILTON BUCHLER, *Primary Examiner.*

FERGUS S. MIDDLETON, *Examiner.*